United States Patent [19]
Meyers et al.

[11] Patent Number: 5,323,334
[45] Date of Patent: Jun. 21, 1994

[54] SENSOR SYSTEM HAVING NONUNIFORMITY SUPPRESSION WITH IMAGE PRESERVATION

[75] Inventors: Franklin J. Meyers, Chatsworth; W. Scott Johnston, Saugus, both of Calif.

[73] Assignee: Hughes Aircraft Company, Los Angeles, Calif.

[21] Appl. No.: 985,724

[22] Filed: Dec. 4, 1992

[51] Int. Cl.$^5$ ............................................. G01D 5/26
[52] U.S. Cl. .......................... 364/571.05; 364/571.02
[58] Field of Search ...................... 364/571.01, 413.24, 364/571.02, 571.05; 250/363.07, 557, 330, 332, 334; 382/14, 23, 28, 45

[56] References Cited
U.S. PATENT DOCUMENTS

| | | | |
|---|---|---|---|
| 4,432,059 | 2/1984 | Inbar et al. | 364/413.24 |
| 4,695,964 | 9/1987 | Seto et al. | 364/571.01 |
| 4,764,885 | 8/1988 | Greanias et al. | 364/571.01 |
| 4,975,864 | 12/1990 | Sendall et al. | 364/571.01 |
| 5,175,432 | 12/1992 | Reitman et al. | 364/571.01 |

Primary Examiner—Jack B. Harvey
Assistant Examiner—Thomas Peeso
Attorney, Agent, or Firm—Charles D. Brown; Randall M. Heald; Wanda K. Denson-Low

[57] ABSTRACT

A sensor system includes a sensor (20) having an array (22) of detector elements (24), a movable sensor positioner (32) in which the sensor (20) is mounted, a signal processor (30) that progressively corrects the intensities of the pixels of a sensor output array for detector element nonuniformity, an electronic scene position corrector (40), and a motion controller (36) that provides a movement command (34) to the sensor positioner (32), and transmits the substance of the movement command to the scene position corrector (40). An image array signal is furnished from the sensor (20) to the signal processor (30), while the sensor positioner (32) is controllably moved under command of the motion controller (36). A nonuniformity-compensated output signal (38) of the signal processor (30) is provided to the scene position corrector (40), wherein the position of the image is corrected for the motion of the sensor positioner (32). The resulting sensor output signal (44) has sensor element nonuniformity selectively compensated, but objects in the field of view of the sensor (20) are not suppressed.

19 Claims, 3 Drawing Sheets

SENSOR SYSTEM HAVING NONUNIFORMITY SUPPRESSION WITH IMAGE PRESERVATION

BACKGROUND OF THE INVENTION

This invention relates to sensors, and, more particularly, to the processing of sensor signals to selectively suppress irregularities resulting from detector element nonuniformity while maintaining a proper representation of objects in the sensor field of view.

A "sensor" (as used herein) is a device having an array of detector elements and associated optics that produces an image signal of a scene viewed by the detector elements. There are usually a large number, such as a 256×256 array, of detector elements in the sensor, and the matrix of detector output signals becomes the output signal of the sensor. The detector elements may be made sensitive to various types of energy, and in a common situation the detector elements are sensitive to infrared radiation. The image signal produced by the sensor is typically analyzed for various types of information, such as, for example, the presence of a target object in the field of view of the sensor.

Ideally, each of the detector elements of the array would operate in an absolutely identical manner, so that each detector element would produce the same output signal in response to a particular input signal, over the entire range of the sensor sensitivity. Thus, for example, if the sensor were directed at a featureless scene, under the ideal situation the output of each detector element would be the same. If there are nonuniformities between the outputs of the various detector elements when viewing a featureless scene, the nonuniformities might erroneously be interpreted as features in the field of view of the sensor. This same conclusion is applicable when the scene is not featureless, and it is therefore possible to confuse detector nonuniformities with features.

The ideal case of uniformity in all of the detector element outputs cannot be realistically expected in large element arrays for a variety of reasons. Techniques have therefore been developed to suppress detector-based nonuniformities in the sensor output. For example, U.S. Pat. No. 4,975,864 discloses scene-based nonuniformity compensation that serves to reduce stationary, as contrasted to moving, nonuniformities in the sensor output signal. Stationary nonuniformities are those whose relative position does not change from image to image, and may be due to detector-element nonuniformities. Moving nonuniformities, on the other hand, are features present in the scene viewed by the sensor which exhibit their own motion or motion due to movement of the sensor.

Conventional nonuniformity compensation techniques, while serving a valuable function, may have significant limitations. One such limitation is the possible mistaking of a stationary feature in the viewed scene as detector-based nonuniformity, and the resulting elimination of that feature from the sensor output signal. That is, when a feature is absolutely stationary in the viewed scene, the nonuniformity compensation processor may conclude that the feature is an artifact of detector nonuniformity, and act to progressively reduce the intensity of the feature.

There is a need for a technique whereby stationary objects in the sensor field of view may be differentiated from detector-based nonuniformities. The true nonuniformities are then removed from the sensor output signal in the conventional manner, while the stationary features are permitted to remain in the sensor output signal for further analysis. This differentiation and processing technique must not interfere with the accurate positioning of the features, when the image is eventually analyzed in detail for the presence of targets. The present invention fulfills this need, and further provides related advantages.

SUMMARY OF THE INVENTION

The present invention provides a technique for suppression of detector-based nonuniformities, without loss of stationary features from the sensor output of the viewed image. The true positioning of the stationary features is retained. The approach of the invention is accomplished in real time, without discontinuing the observation of the scene.

In accordance with the invention, an apparatus processes an image produced by a sensor having an array of sensor elements. The apparatus comprises controller means that provides a movement command to a sensor positioner to cause a sensor to physically move. A compensation means corrects for detector element nonuniformity in an image array of pixels produced by the sensor, to form a nonuniformity-compensated image. A repositioning means electronically corrects the indicated position of the nonuniformity-compensated image for the movement of the sensor, responsive to an inverse of the movement command received from the controller means.

Stated in terms of the operation, a method of producing a sensor output signal includes furnishing an image array signal from a sensor having an array of detector elements mounted in a physically movable sensor positioner, while controllably moving the sensor positioner. The method further includes processing the image array signal to progressively correct pixel intensities of the signal for detector element nonuniformity, and electronically correcting the indicated position of the processed image array signal for the movement of the sensor positioner to provide a sensor output signal having sensor element nonuniformity selectively compensated but objects in the field of view of the sensor not suppressed.

A certain way to distinguish between a detector-based nonuniformity and a feature in the scene viewed by the sensor is to physically move the sensor. A detector-based nonuniformity will not move in the pixel field of the sensor, as it moves with the sensor. A feature in the scene will move relative to the sensor field of the sensor, unless the feature happens to follow exactly the same pattern as the movement of the sensor. If the pattern of movement of the sensor is chosen with regard to possible scene-element motion, it is highly unlikely that any feature in the scene will move with that same pattern, and features in the scene can be distinguished from nonuniformities present as a result of detector operation.

The present approach is implemented in combination with existing techniques and hardware. It permits existing nonuniformity compensation techniques to be used more effectively, and yields information suitable for further image processing. Other features and advantages of the present invention will be apparent from the following more detailed description of the preferred embodiment, taken in conjunction with the accompany-

DETAILED DESCRIPTION OF THE INVENTION

Figure 1:
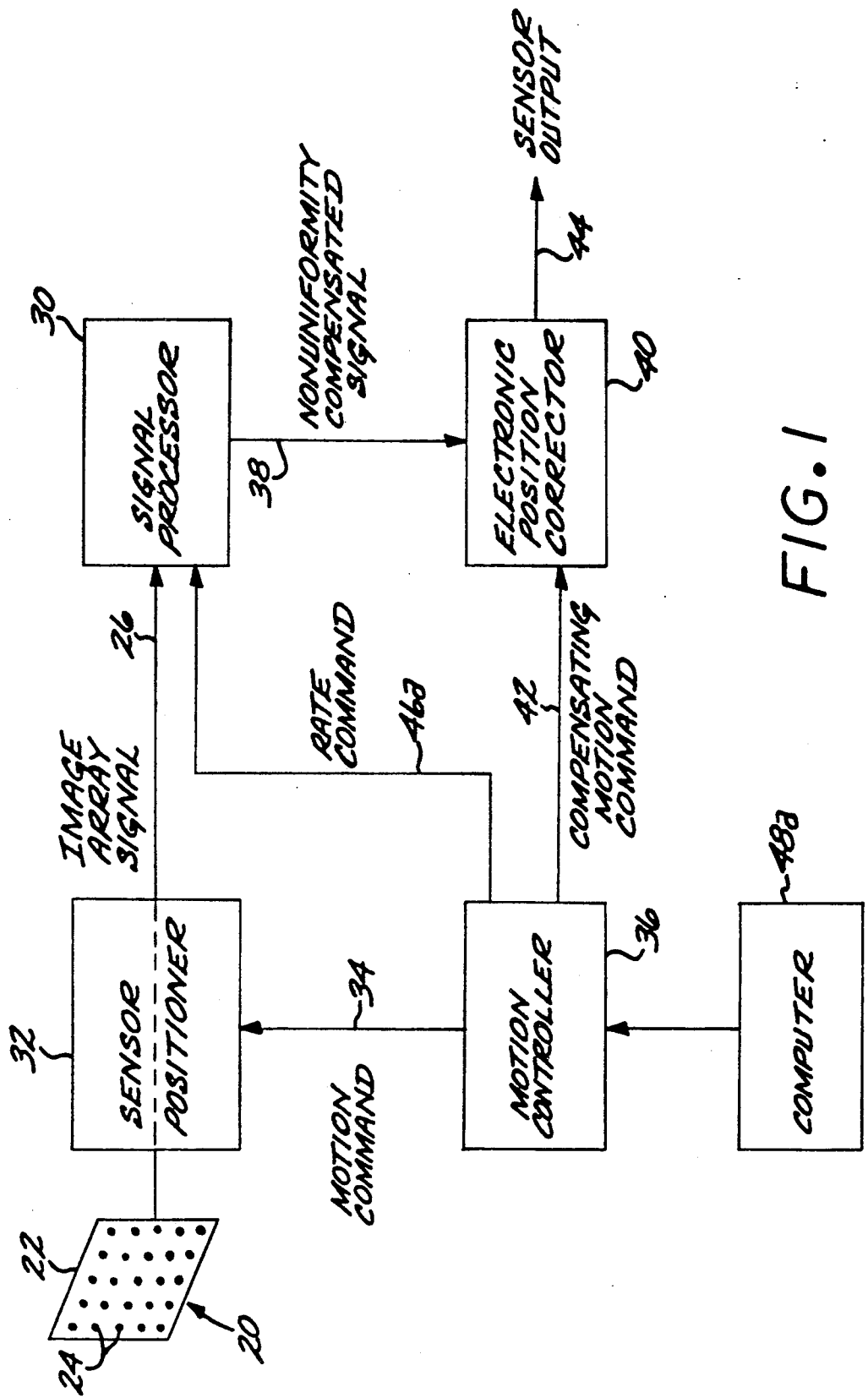
FIG. 1 is a block diagram of one embodiment of the invention.
Figure 2:
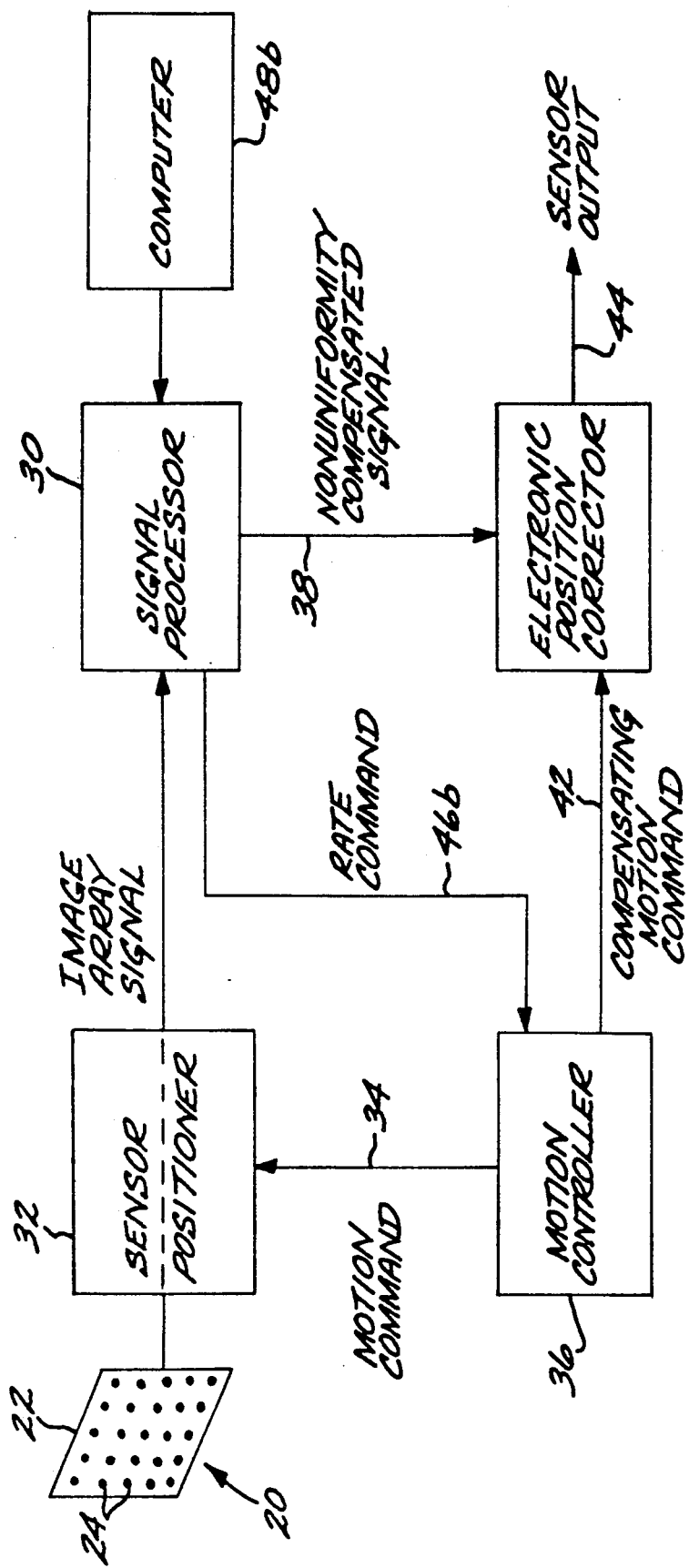
FIG. 2 is a block diagram of a second embodiment.

The present invention provides an apparatus and method for providing a correctly positioned, nonuniformity-compensated sensor output signal suitable for subsequent image analysis. A preferred embodiment of the approach is depicted in FIG. 1, and a second embodiment is depicted in FIG. 2.

Referring to these figures, a sensor 20 includes a detector array 22 having a plurality of detector elements 24. The detector elements 24 are preferably, but not necessarily, infrared-sensitive detector elements of the type known in the art. In the figures, a 5×5 array of detector elements 24 is shown for ease of illustration, but in practical sensors the arrays have much larger numbers of detector elements 24, such as, for example, a 256×256 array of detector elements 24. Optics or other means is used to image a scene onto the detector array 22, so that each detector element 24 views a portion of the scene. The sensor 20 digitizes the output of the detector elements 24, and makes them available as an image array signal 26.

Figure 3:
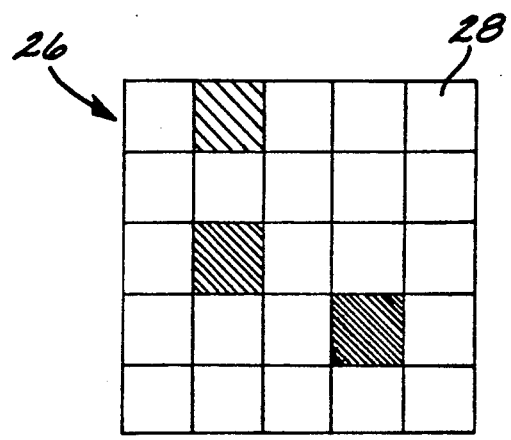
FIG. 3 is a schematic depiction of an image array signal.

If all of the detector elements 24 exhibited exactly the same response curves, the image array signal 26 could be used directly for further image processing. Unfortunately, that ideal is never achieved. FIG. 3 depicts the pixels 28 of a hypothetical 5×5 image array signal 26 for a detector array 22 aimed at a scene. Most of the pixels 28 are of about the same intensity, but some have lesser intensities than the others and are shown darker. Others could have greater intensities, but cannot readily be illustrated.

In viewing only the image array signal 26, it is impossible to tell whether the darker pixels are due to nonuniformities in the detector array elements 24, or due to the presence of features in the scene. If the darker pixels are due to features in the scene that are moving, they could be discerned by their movement in a time series of image array signals like that of FIG. 3. However, if the same pixels remain dark in the time series of image array signals, it is not possible to readily determine just from the time series of image array signals whether the darker pixels are associated with nonuniformities in the response of the detector elements or with actual stationary features in the scene.

The image array signal 26 is provided to a signal processor 30, which processes the signal to reduce detector-based nonuniformities. The preferred signal processor 30 is of a type known in the art, a scene-based nonuniformity compensator such as that disclosed in U.S. Pat. No. 4,975,864, whose disclosure is incorporated by reference. Briefly, in such a scene-based nonuniformity compensator, the individual output signals 26 are processed pixel-by-pixel through three different filters, an antimedian cross-shaped filter, an antimedian plus-shaped filter, and a comparison filter that compares each pixel to a present intensity level. A compensation term for each detector element output is selected responsive to one of the outputs of the three filters. The compensation term is selected to adjust the output of each detector element 24 so as to become similar to that of the adjacent detector elements. The adjustment is made in a progressive, iterative fashion to avoid overcorrecting the output signal of any detector element. The result over time is that the output signal of each detector element 24 is adjusted so as to behave as though its response characteristic is nearly identical to that of every other detector element.

As indicated, this process does not distinguish between detector element signals that are different from those of adjacent detector elements due to features in the scene as compared with detector-based nonuniformities. To make this distinction, the sensor 20 is mounted on a sensor positioner 32 that permits the detector array 32 to be moved physically relative to the scene being viewed. The sensor positioner 32 is preferably a gimbal of the known type that permits the detector array 22 to be controllably moved in orthogonal arcs.

The sensor positioner 32 is driven by a motion command 34 supplied by a motion controller 36. The motion command 34 is preferably a scan that causes the detector array 22 to follow a circular or other track not likely to be followed by moving features in the scene. The result of moving the detector array 22 is that a feature in the viewed scene will not be stationary relative to particular pixels of the image array signal 26, while a detector-based nonuniformity will remain associated with a fixed pixel whether or not the detector array 22 is scanned. This movement therefore permits the signal processor 30 to distinguish between features of the scene whose contrast is not to be reduced, and detector-based nonuniformities whose contrast is to be reduced.

Thus, a nonuniformity-compensated signal 38 of the signal processor 30 will repeatedly suppress detector-based nonuniformities, but features of the scene will cause minor one-time changes in detector element response, as the detector array 22 is moved under control of the motion controller 36. However, the apparent position of the features in the signal 38 is displaced from their true positions as a result of the induced movement. This displacement must be corrected for, as the actual location of features in the scene must be known for subsequent image processing operations such as distinguishing and tracking targets in the field of view of the sensor.

To correct for the image displacement induced by the motion of the detector array 20, the signal 38 is provided to an electronic position corrector 40. The position corrector 40 is electronic in nature, and does not represent a physical movement. Instead, the position corrector 40 executes an electronic correction to correct the position of each pixel back to its position as though the physical motion of the sensor positioner 32, as commanded by the motion command 34, had not occurred. To make this correction, the motion controller 36 provides to the electronic position corrector 40 an indication of the motion command 34 sent to the sensor positioner 32. Preferably, the motion controller 36 transmits to the electronic position corrector 40 a compensating motion command 42, which is the inverse of the net motion command 34. Time delay compensation is provided to account for differences in sensor position at the time of data/image acquisition and the time of the electronic correction. Equivalently, the motion can be sensed, as by a gyro, and this sensed motion can be used by the electronic positioning controller.

Figure 4:
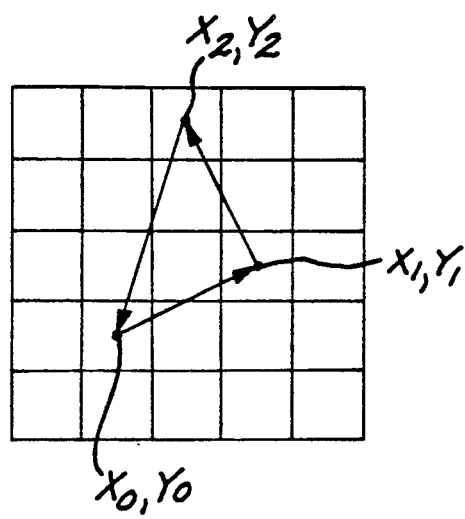
FIG. 4 is a schematic depiction of electronic position correction.

FIG. 4 depicts an example of the electronic position correction of a pixel originally at a position (Xo,Yo). In this representation, the physical motion of the sensor positioner 32 first moves the pixel (Xo,Yo) to (X1,Y1) and then in a second step to (X2,Y2). In practice, there are normally more steps as well. At each step, the motion controller 36 provides the movement information to the electronic position corrector 40, which performs a linear repositioning of the pixel by an opposite amount $(-Xi,-Yj)$, in this case $(-X2,-Y2)$. Since the detector array 22 moves as a rigid body, all pixels are corrected by the same amount corresponding to the inverse of the net of the relevant motion commands 34.

A sensor output 44 flows from the electronic position corrector 40. The sensor output 44 has the following characteristics. The location of each pixel is properly placed relative to some predefined frame of reference, due to the electronic position correction 40. The intensity of each pixel is adjusted to compensate for nonuniformities in the characteristics of the detector elements 24. However, image features are retained, not mistaken as detector nonuniformities, due to the induced physical motion of the sensor positioner 32 under command of the motion controller 36. The sensor output 44 is therefore a true representation of the scene viewed by the sensor 20. The sensor output 44 is ready for further signal processing, as by pattern analysis techniques that are able to identify targets having particular characteristics from among the many features present in the image.

In the preferred form of the invention, the motion controller 36 and the signal processor 30 are interconnected by a rate command 46. The apparatus may be structured so that the rate command 46 flows in either direction between the controller 36 and the signal processor 30. In the preferred embodiment shown in FIG. 1, a computer 48a provides the motion pattern and rate of movement to the motion controller 36, which produces motion commands 34 and compensating motion commands 42. The rate of motion 46a is provided to the signal processor 30. The signal processor can use the motion rate 46a information either to make adjustments to the image signal 26 at a rate which depends upon the rate of motion 46a of the sensor positioner 32, or to adjust the convergence rate of the pixel intensity compensation. For example, if the sensor positioner 32 is moved rapidly, it is preferred to perform adjustments at a high rate and to make the pixel intensity to converge to the nonuniformity-compensated value rapidly.

In an alternative embodiment shown in FIG. 2, the computer 48b provides the rate information directly to the signal processor 30. The rate command 46b is transmitted from the signal processor 30 to the motion controller 36, which in turn generates the motion command 34 and the compensating motion command 42. The interrelationships are otherwise similar to those described in relation to FIG. 1.

The present invention provides an important advance in the art of scene analysis and recognition. The present approach does not analyze sensor outputs for targets. Instead, it compensates the sensor output signal for nonuniformities in the individual detectors, while retaining the features of the image so that they may be subsequently analyzed for the presence of targets of interest. Although a particular embodiment of the invention has been described in detail for purposes of illustration, various modifications may be made without departing from the spirit and scope of the invention. Accordingly, the invention is not to be limited except as by the appended claims.

What is claimed is:

1. Apparatus for processing an image produced by a sensor having an array of sensor elements, comprising:
   controller means for providing a movement command to a sensor positioner to cause a sensor to physically move;
   compensation means for correcting for detector element nonuniformity in an image array of pixels produced by the sensor, to form a nonuniformity-compensated image; and
   repositioning means for electronically correcting the indicated position of the nonuniformity-compensated image for the movement of the sensor, responsive to an inverse of the movement command received from the controller means.

2. The apparatus of claim 1, wherein the compensation means includes a scene-based nonuniformity calculator.

3. The apparatus of claim 1, wherein the controller means provides the movement command to the compensation means.

4. The apparatus of claim 1, wherein, the compensation means provides the movement command to the controller means.

5. The apparatus of claim 1, further including a sensor positioner and a sensor supported therein.

6. The apparatus of claim 5, wherein the sensor positioner includes a gimbal in which the sensor is mounted.

7. The apparatus of claim 5, wherein the sensor is an infrared sensor formed of a plurality of detector elements.

8. A method of producing a sensor output signal, comprising the steps of:
   furnishing an image array signal from a sensor having an array of detector elements mounted in a physically movable sensor positioner;
   controllably moving the sensor positioner;
   processing the image array signal to progressively correct pixel intensities of the signal for detector element nonuniformity; and
   electronically correcting the indicated position of the processed image array signal for the movement of the sensor positioner to provide a sensor output signal having sensor element nonuniformity selectively compensated but objects in the field of view of the sensor not suppressed.

9. The method of claim 8, wherein the step of processing is accomplished by a scene-based nonuniformity compensator.

10. The method of claim 8, wherein the steps of controllably moving, processing, and electronically correcting all operate responsive to a movement command.

11. The method of claim 8, wherein the sensor positioner includes a gimbal in which the sensor is mounted.

12. The method of claim 8, wherein the sensor is an infrared sensor formed of a plurality of infrared detector elements.

13. The method of claim 8, wherein the step of electronically correcting includes the step of
    determining the movement of the sensor positioner from a motion command sent to the sensor positioner.

14. The method of claim 8, wherein the step of electronically correcting includes the step of determining the movement of the sensor positioner from a measurement of the movement of the sensor.

15. A method of producing a sensor output signal, comprising the steps of:

providing
- a sensor having an array of detector elements,
- a movable sensor positioner in which the sensor is mounted,
- a signal processor that progressively corrects the intensities of the pixels of a sensor output array for detector element nonuniformity,
- an electronic scene position corrector, and
- a motion controller that provides a movement command to the sensor positioner, and transmits the substance of the movement command to the scene position corrector;

furnishing an image array signal from the sensor to the signal processor, while controllably moving the sensor positioner under command of the motion controller; and furnishing a nonuniformity-compensated output signal of the signal processor to the scene position corrector, wherein the position of the image is corrected for the motion of the sensor positioner to provide a sensor output signal having sensor element nonuniformity selectively compensated but objects in the field of view of the sensor not suppressed.

16. The method of claim 15, wherein the signal processor includes a scene-based nonuniformity calculator.

17. The method of claim 15, wherein the motion controller provides the movement command to the signal processor.

18. The method of claim 15, wherein the signal processor provides the movement command to the controller.

19. The method of claim 15, wherein the sensor is an infrared sensor formed of a plurality of infrared detector elements.

* * * * *